Nov. 3, 1959

E. J. GRAJECK 2,910,724

APPARATUS FOR PRODUCING PATTERNED
FOAM RUBBER COATED FABRICS

Filed July 3, 1956

INVENTOR:
Edwin Joseph Grajeck,
BY
ATTORNEYS

Nov. 3, 1959 E. J. GRAJECK 2,910,724
APPARATUS FOR PRODUCING PATTERNED
FOAM RUBBER COATED FABRICS
Filed July 3, 1956 4 Sheets-Sheet 2
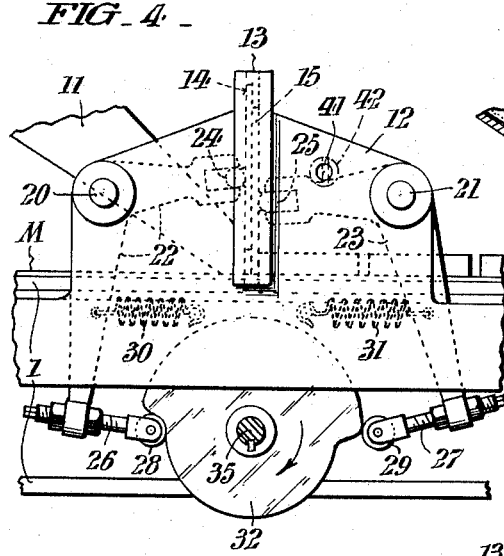
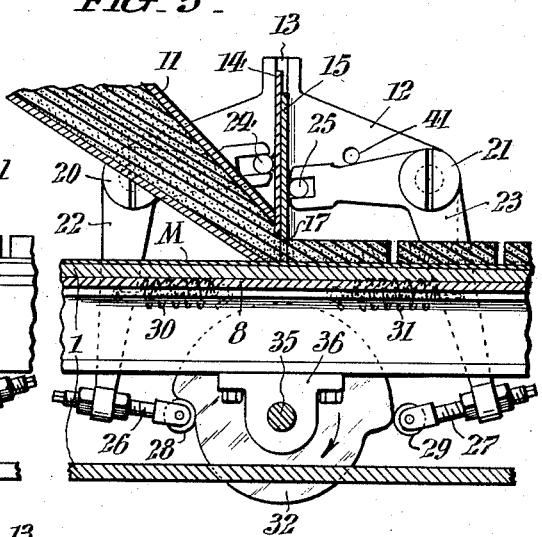
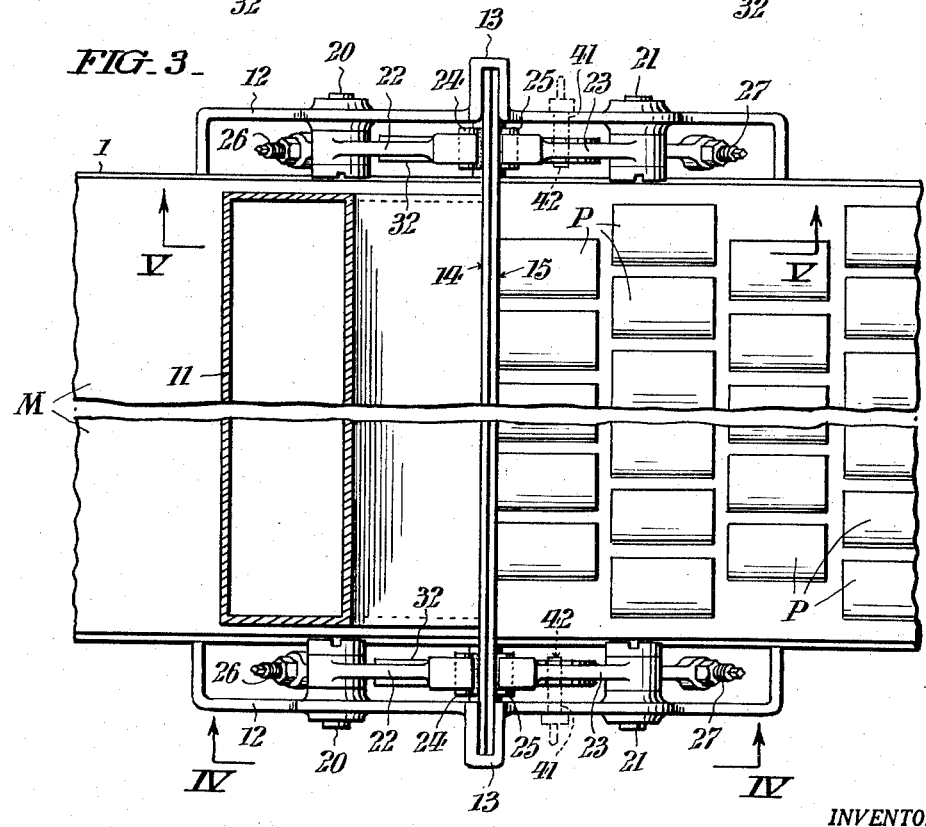
INVENTOR:
Edwin Joseph Grajeck,
BY Paul & Paul
ATTORNEYS

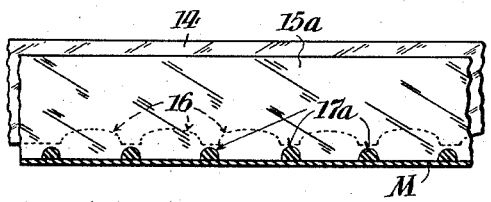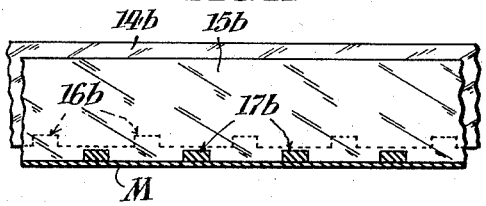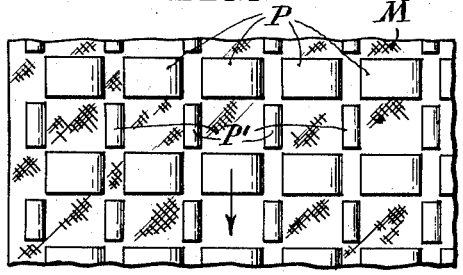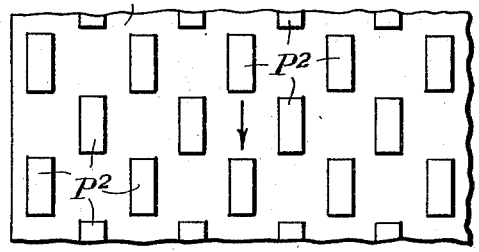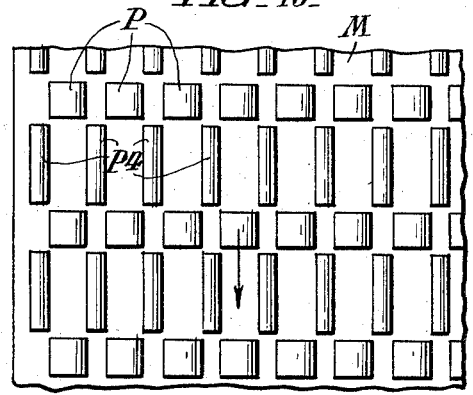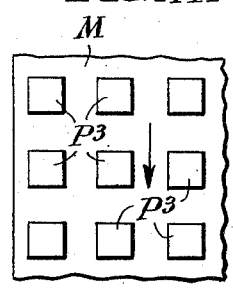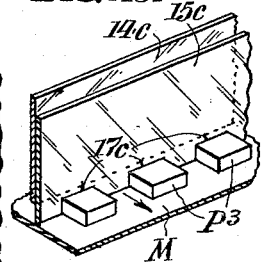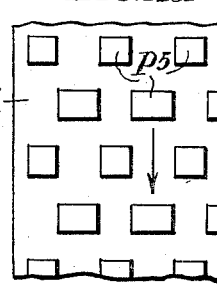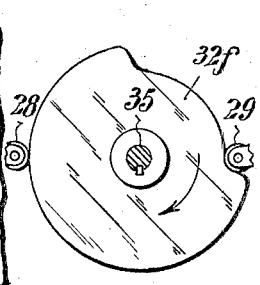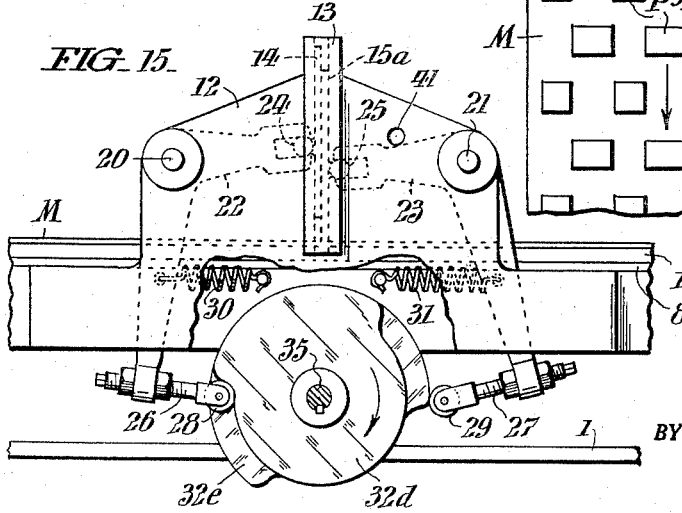

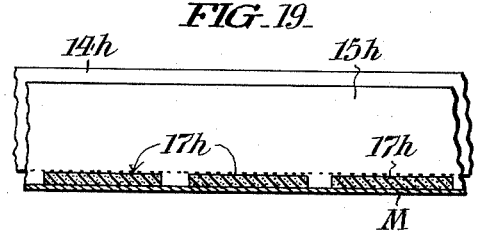
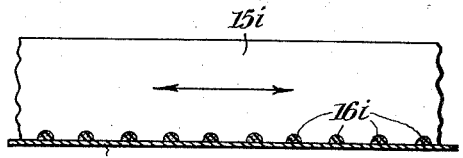
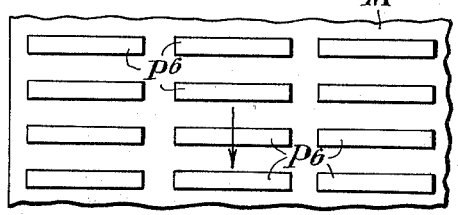
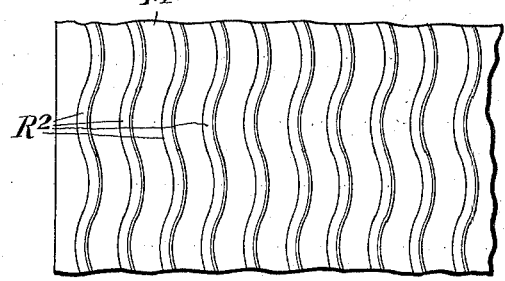
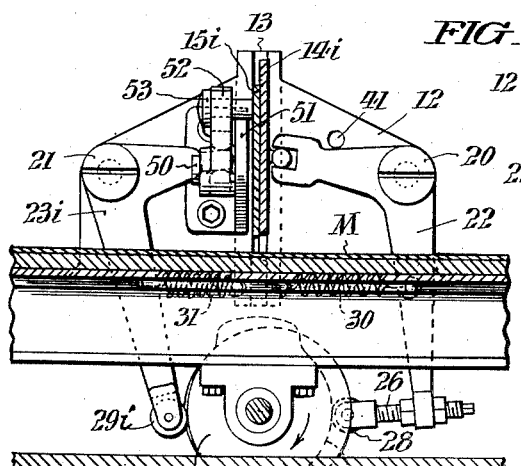
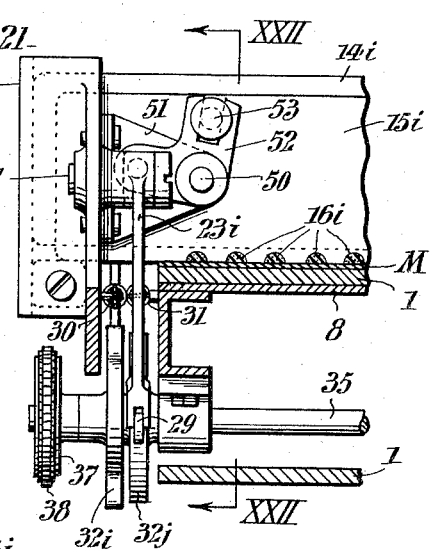
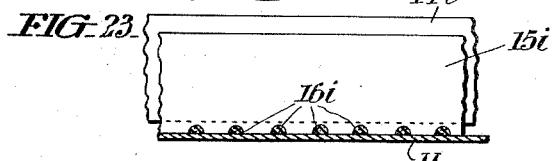
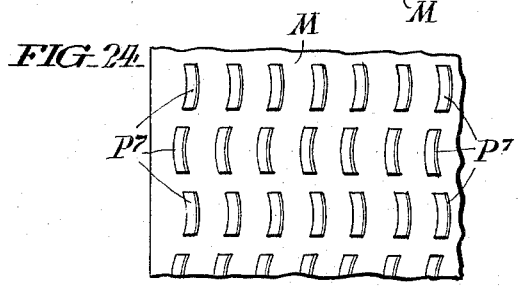

United States Patent Office 2,910,724
Patented Nov. 3, 1959

2,910,724

APPARATUS FOR PRODUCING PATTERNED FOAM RUBBER COATED FABRICS

Edwin J. Grajeck, Philadelphia, Pa., assignor to Collins & Aikman Corporation, Downingtown, Pa., a corporation of Pennsylvania Application July 3, 1956, Serial No. 595,635

9 Claims. (Cl. 18—4)

This invention relates to apparatus useful in the commercial production of patterned foam rubber coated fabrics.

My invention is directed, in the main, toward the provision of an apparatus for the above purpose which is simple in construction; which is operable at relatively high speeds in the continuous production of the patterned fabric; which is economical from the standpoint of power consumption; and which, upon making certain simple easy adjustments and/or by substitutions as between a few simple interchangeable parts, is adaptable for the production of fabrics with an infinite variety of different ornamental designs in the rubber coating.

Other objects and attendant advantages will appear from the following detailed description of the attached drawings, wherein:

Fig. 3 is a fragmentary view, in top plan, looking as indicated by the angled arrows III—III in Fig. 1.

Figs. 4 and 5 are detail views respectively in elevation and in section, taken as indicated by the angled arrows IV—IV and V—V respectively in Fig. 3.

Fig. 6 is a fragmentary view in perspective showing how one type of ornamentation is formed in the apparatus.

Fig. 7 is a cross sectional view of other ornamented fabric such as can be produced in the apparatus.

Fig. 8 is a perspective view showing a differently ornamented fabric such as can also be produced in the apparatus.

Fig. 9 is a fragmentary view in transverse section similar to Fig. 2 showing a modification of the apparatus.

Fig. 10 is a fragmentary view, in top plan, of patterned fabric produced by the apparatus when modified as in Fig. 9.

Fig. 11 is a fragmentary view similar to Fig. 9 showing another modification of the apparatus.

Fig. 12 is a fragmentary view, of patterned fabric produced by the apparatus when modified as in Fig. 11.

Fig. 13 is a fragmentary perspective view showing another modification of the apparatus.

Fig. 14 is a fragmentary view, of patterned fabric produced in the apparatus when modified as in Fig. 13.

Fig. 15 is a fragmentary view similar to Fig. 4 of another modification.

Fig. 16 is a fragmentary view of patterned fabric produced by the apparatus when modified as in Fig. 15.

Fig. 17 is a fragmentary view similar in turn to Fig. 15 showing another modification.

Fig. 18 is a fragmentary view of patterned fabric produced by the apparatus when modified as in Figs. 13 and 17.

Fig. 19 is a fragmentary view similar to Fig. 9 of another modification.

Fig. 20 is a fragmentary view of ornamented fabric produced by the apparatus when modified as in Fig. 19.

Figs. 21, 22 and 23 are fragmentary views corresponding respectively to Figs. 2, 5 and 9 showing another modification.

Fig. 24 is a fragmentary view of ornamented fabric produced in the apparatus when modified as in Figs. 21-23.

Fig. 25 shows still another modification; and

Fig. 26 is a fragmentary view of fabric produced by the apparatus when modified as in Figs. 21, 22 and 25.

Figure 1:
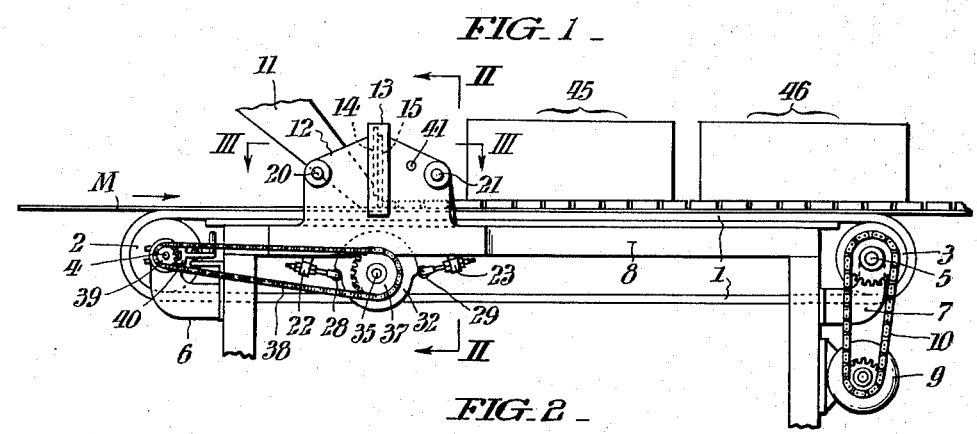
Fig. 1 is a view, in side elevation, of an apparatus for producing patterned foam rubber coated fabric, conveniently embodying my invention in one form.
Figure 2:
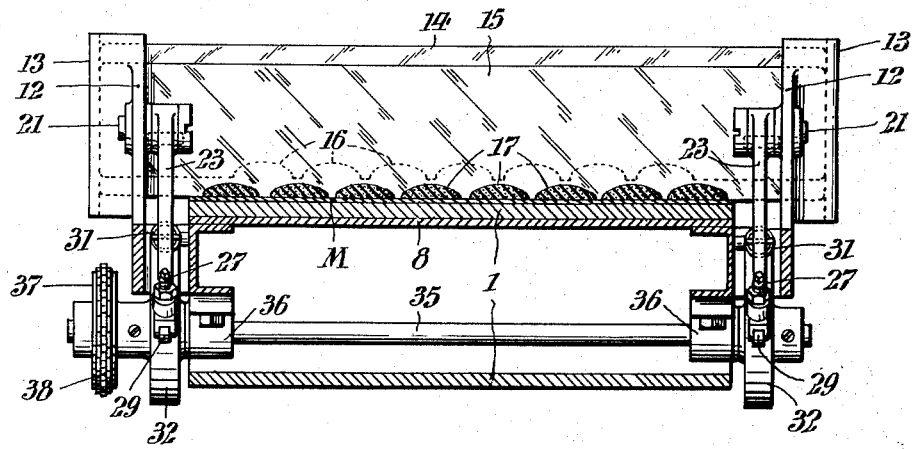
Fig. 2 is a cross section of the apparatus taken as indicated by the angled arrows II—II in Fig. 1, and drawn to a larger scale.
Figure 2:
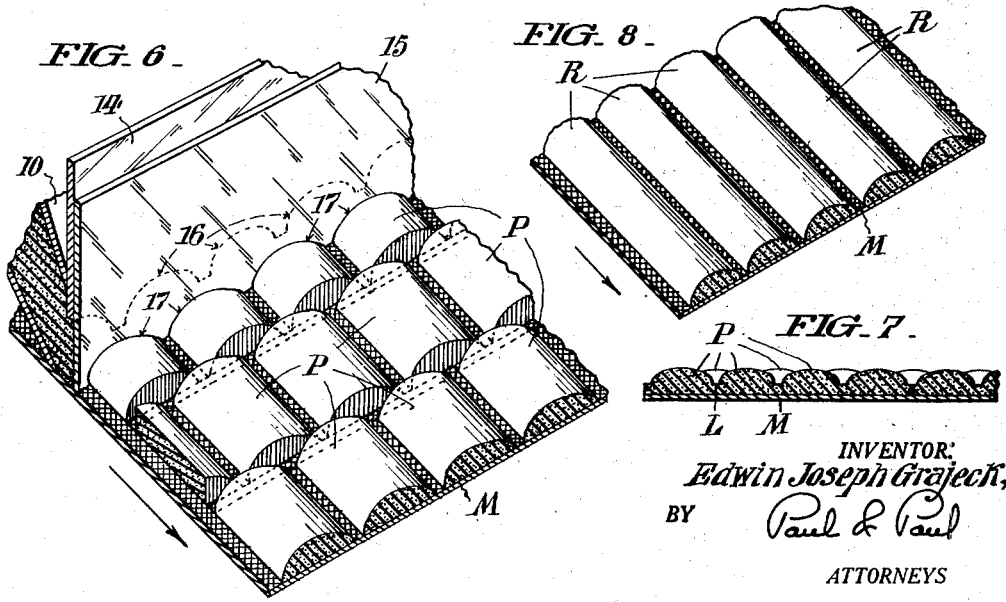

In the embodiment of the invention illustrated in Figs. 1-6, the apparatus comprises a horizontally-arranged endless apron conveyor 1 which is trained about end pulleys 2 and 3. The shafts 4 and 5 of the pulleys 2 and 3 are rotatively supported in bearings 6 and 7 respectively secured to a table 8 the top of which is overtraveled by the upper run of the conveyer 1. For driving the conveyer 1 there is shown, at 9, a gear motor which is connected, by a belt or sprocket chain 10, with the pulley shaft 5. Supported transversely above the table 8 is an inclined chute 11 whereby raw aerated latex is discharged upon a base or foundation sheet M of woven, knitted or other suitable material continuously advanced rightward on the conveyer 1, i.e. in the direction indicated by the arrow in Fig. 1.

Affixed to opposite sides of the table 8 are brackets 12 having ways 13 for the guidance of a pair of juxtaposed gate blades 14 and 15 to up and down movement across the mouth of the chute 10. As shown, the bottom edges of the blades 14 and 15 are notched in this instance as at 16 and 17 respectively in Figs. 2 and 6, the notches of one blade alternating with the notches of the other blade. Engaged in each of the brackets 12 are two studs 20 and 21 which are symmetrically disposed relative to the guideways 13 and whereon are fulcrumed bell crank levers 22 and 23 respectively of which the horizontal arms are notched or bifurcated to engage rounded projections 24, 25 on the blades 14 and 15. Adjustable in the ends of the pendent arms of the bell crank levers 22 and 23 are studs 26 and 27 provided with rollers 28 and 29 which are held, by the action of springs 30 and 31 effective upon the bell crank levers, in engagement with rotary cams 32 on a transverse shaft 35 supported in fixed bearings 36 on the table. It is to be noted that in this instance, the concentric high and low peripheral edge portions of the cams 32 are equal in circumferential extent. Affixed to the shaft 35 is a sprocket wheel 37 (Figs. 1 and 2) which, by a chain 38, is connected to a sprocket pinion 39 mounted on the pulley shaft 4 with capacity to be coupled to or uncoupled therefrom by means of a manually-operable clutch 40. For a purpose later explained, the brackets 12 are provided with apertures 41 through which pins such as shown in broken lines at 42 in Figs. 3 and 4 can be inserted to lock the bell crank levers 23 in retracted position.

Suitably supported over the table 8 rightward of the frames 11 or in the direction of travel of the upper run of the conveyer 1, are a gelling chamber 45 and a vulcanizing chamber 46.

*Operation*

During progression of the base material M over the top of the table 8 by the belt 1, the blades 14 and 15 are alternately lowered and raised into and out of contact with the material M by action of the levers 22 and 23 as the shaft 35 revolves. Accordingly, when the blade 14 is in raised position as in Figs. 2-6, latex flowing from the trough 11 will pass through the notches 17 of the blade 15 onto the running base material M. On the other hand, when the blade 15 is raised and the blade 14 is lowered, the latex will pass from the chute 11 onto the material M through the notches 16 of said blade 14. Now since the speed of the conveyer 1 is uniform and the high and low portions of the cams 32 are of equal circumferential extent in this instance, staggeringly arranged transversely rounded latex projections P of equal length are formed as shown in Fig. 6 upon the base material M. By the further advance of the material in the apparatus through the chambers 45 and 46, the latex ornamentation is first gelled and thereby bonded to the material and thereafter set for stability in the finished fabric discharged from the apparatus.

By adjusting the rollers 28 and 29 toward the long arms of the bell crank levers 22 and 23 by which they are supported respectively, it will be seen that, by action of the cams 32, the blades 14 and 15 will be stopped short of contact with the base material M. Under these conditions, a layer of latex will be formed as at L in Fig. 7, together with rounded ornamental projections P upstanding therefrom.

By disconnecting the clutch 40 to stop the chain 38 with the cams 32 positioned as in Figs. 4 and 5 to hold the blade 14 raised and the blade 15 in its lowermost position, it is possible to produce, as will be readily understood, the ornamentation shown in Fig. 8 characterized by continuous longitudinally-extending laterally-spaced transversely rounded ribs R of latex on the base material M.

By substituting for the blade 15, a blade such as shown at 15a in Fig. 9 having small semicircular notches 17a in alternation with the wide notches 16 of the blade 14, the pattern, shown in Fig. 10, will be produced, the same characterized by narrow rounded projections P1 of latex in alternation with the wide projections P on the base material M.

Again, by substituting for the blades 14 and 15 blades of the type designated 14b and 15b in Fig. 11 respectively provided with small square notches 16b and 17b, it is possible to produce the ornamentation illustrated in Fig. 12 having staggeringly arranged sharp edged widely spaced elongate projections P2 of the latex on the base material M.

Still further, by substituting for the blade 14 a plain unnotched blade 14c as in Fig. 13 and a blade 15c having closely spaced square notches 17c, and by locking the bell crank levers 23 in retracted position by means of the pins 42 as indicated in broken lines in Figs. 3–5, the ornamentation produced will appear as illustrated in Fig. 14, i.e. as sharp-edged square projections P3 uniformly spaced both longitudinally and laterally on the base material M.

The pattern of Fig. 16 is characterized by having wide projections P in alternation with longer and narrower projections P4 of latex on the base material M. This pattern can be produced by use of blades similar to the blades 14 and 15a of Fig. 9 and by substituting for each of the cams 32 in the apparatus a pair of cams such as shown at 32d and 32e in Fig. 15 respectively for actuating the bell crank levers 22 and 23. As shown, the circumferential extent of the high portion of the cam 32e is considerably greater than that of the cam 32d, with the result that the blade 15a with the small notches will remain lowered for a longer period than the blade 14. This accounts for the greater length of the latex projections P4 of the fabric in Fig. 16.

By substituting for each of the cams 32 a cam such as shown at 32f in Fig. 17 to actuate the bell cranks and using blades of the type shown in Fig. 11, it is possible to produce the pattern of Fig. 17, wherein the transverse rows of the alternating latex projections P5 are more widely spaced on the base material than in Figs. 6, 10, 12 or 16. In this instance, it will be noted from Fig. 18, that the cam is so configured that both blades 14b and 15b will be held depressed for a definite interval during each rotation of the shaft 35 to determine the longitudinal spacing referred to.

The pattern of Fig. 20 having laterally arranged longitudinally spaced elongate bar like projections P6 of latex on the base material M can be produced in the apparatus with use of a plain moving blade 14h and a blade 15h having closely spaced elongate notches 17h held stationary, in the same manner as above described in connection with Figs. 13 and 15.

In the modified apparatus construction illustrated in Figs. 21, 22 and 23, the blade 14i is plain, and the blade 15i is notched at the bottom as at 16i. Fulcrumed at 50 on a small inwardly projecting bearing member 51 affixed to one of the brackets 12 is a small bell crank lever 52 whereof one arm is bifurcated to engage a stud 53 anchored in the blade 15i. The short arm of a substituted bell crank lever 23i is operatively connected to the other arm of the small bell crank lever 52. The rollers 28 of the bell crank levers 23, of which there is but one shown, ride the peripheries of cams 32i, and the roller 29i of the bell crank lever 22i rides on the periphery of an eccentric auxiliary cam 32j. The cams 32i have rises which are approximately a quadrant in extent. Accordingly with this modified arrangement, the blade 15i is shifted back and forth transversely of the apparatus during each rotation of the shaft 35, while the blade 14i is intermittently depressed. As a consequence, the pattern produced is as shown in Fig. 24, the same being characterized by alternating transverse rows of oppositely curved segmental arcuate projections P7 on the base material M.

By omitting the blade 14i in Figs. 21–23 and 25, or by locking the levers 22 in retracted position by means of stop pins inserted into the apertures 41 in the brackets 12, continuous waved ridges such as shown at R2 in Fig. 26 will be formed on the base material end.

From the foregoing it will thus be seen that by making a few simple adjustments and substitutions in the apparatus of my invention, a great number of different pattern effects, of which those illustrated are typical, can be produced expeditiously and continuously.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appended claims, and that in some cases certain features of my invention may be used to advantage without a corresponding use of other features.

Having thus described my invention, I claim:

1. In apparatus for producing patterned foam rubber coated fabric, a horizontally moving conveying surface for supporting and advancing base material in sheet form, a hopper for raw aerated latex having an inclined chute disposed transversely over the advancing base material on the conveying surface with its delivery end open in the direction of travel of the base material; a flow control blade extending crosswise of the delivery end of the chute; a second crosswise flow control blade in association with the first mentioned blade, at least one of said blades being notched, and means for reciprocating the un-notched blade vertically relative to the moving surface during advance of the base material on the conveying surface to intermittently intercept flow of the latex from the hopper.

2. The invention according to claim 1, further including means beyond the chute in the direction of movement of the conveying surface for vulcanizing the latex deposited upon the base sheet.

3. In apparatus for producing patterned foam rubber coated fabric, a horizontally moving conveying surface for supporting and advancing base material in sheet form;

a hopper for raw aerated latex having an inclined chute disposed transversely over the advancing base material on the conveying surface with its delivery end open in the direction of travel of the base material; a pair of notched flow control blades extending crosswise of the delivery end of the chute, the notches of one blade alternating with the notches of the other blade; and means for reciprocating the blades vertically in alternation relative to the conveying surface during advance of the material on the conveying surface.

4. The invention according to claim 3, further including means beyond the chute in the direction of movement of the conveying surface for vulcanizing the latex deposited upon the base sheet.

5. In apparatus for producing patterned foam rubber coated fabric, a horizontally moving conveying surface for supporting and advancing base material in sheet form; a hopper for raw aerated latex having an inclined chute disposed transversely over the advancing base material on the conveying surface with its delivery end open in the direction of travel of the base material; a plain flow control blade extending crosswise of the delivery end of the chute; an associated notched flow control blade; and means for vertically reciprocating the plain blade relative to the advancing material on the conveying surface to occasionally restrict flow of the latex through the notches of the notched blade.

6. The invention according to claim 5, further including means beyond the chute in the direction of movement of the conveying surface for vulcanizing the latex deposited upon the base sheet.

7. The invention according to claim 5, wherein the notches of one blade are larger than the notches of the other blade.

8. In apparatus for producing patterned foam rubber coated fabric, a horizontally moving conveying surface for supporting and advancing base material in sheet form; a hopper for raw aerated latex disposed transversely over the advancing base material on the conveying surface with its delivery end open in the direction of travel of the base material; a plain flow control blade extending crosswise of the delivery end of the chute; an associated notched flow control blade; means for reciprocating the notched blade endwise; and means for vertically reciprocating the plain blade relative to the advancing base material on the conveying surface to occasionally restrict flow of the latex through the notches of the notched blade.

9. The invention according to claim 8, further including means beyond the chute in the direction of movement of the conveying surface for vulcanizing the latex deposited upon the base sheet.

References Cited in the file of this patent

UNITED STATES PATENTS

| | | |
|---|---|---|
| 697,696 | Watson | Apr. 15, 1902 |
| 2,102,607 | Baker | Dec. 21, 1937 |
| 2,161,308 | Murphy et al. | June 6, 1939 |
| 2,308,951 | Novotny et al. | Jan. 19, 1943 |
| 2,586,275 | Toulmin | Feb. 19, 1952 |
| 2,615,822 | Huebner | Oct. 28, 1952 |